UNITED STATES PATENT OFFICE.

OTTO ERNST AND CARL PRETZELL, OF HÖCHST-ON-THE-MAIN, GERMANY, ASSIGNORS TO FARBWERKE VORM. MEISTER LUCIUS & BRÜNING, OF HÖCHST-ON-THE-MAIN, GERMANY, A CORPORATION OF GERMANY.

MAKING RED AZO DYE LAKES.

No. 888,981.  Specification of Letters Patent.  Patented May 26, 1908.

Application filed April 11, 1907. Serial No. 367,511.

*To all whom it may concern:*

Be it known that we, OTTO ERNST, Ph. D., and CARL PRETZELL, Ph. D., chemists, citizens of the German Empire, and residing at Höchst-on-the-Main, Germany, have invented certain new and useful Improvements in Making Red Azo Dye Lakes, of which the following is a specification.

The dyestuff obtained by combining diazotized ortho-nitranilin with 2-naphthol-6-sulfonic acid has not hitherto been used for the technical manufacture of body colors. We have found that this dyestuff is specially suited for this purpose and yields body colors of commercially valuable properties.

The dyestuff is applied to a substratum in a suitable manner, orange-red to scarlet-colored products being obtained which are advantageously distinguished by their clear tints and excellent fastness to light, sufficing to fulfil the highest demands in this respect, particularly as compared with the lakes obtained from the ordinary acid azo-orange dyestuffs.

The dyestuff used according to this invention is also superior to the azo-orange dyestuffs with respect to their being readily precipitated as metallic salts.

The body colors may be obtained, for instance, as follows:—

Example: 100 kilos of finely ground heavy spar are well stirred with a suitable proportion of water, say 100 kilos and a solution of 5 kilos of the sodium salt of the dyestuff from ortho-nitrodiazobenzene and 2-naphthol-6-monosulfonic acid is added. A solution of 6 kilos of anhydrous calcium chlorid is then allowed to run in while stirring well and the whole is heated to ebullition. The pigment is then dried and used as a painting color.

The manufacture of the dyestuff and body colors may also occur in a single operation, for instance, as follows:—

A diazo solution obtained in the known manner from 13.8 kilos of ortho-nitranilin. 34 kilos of hydrochloric acid of 20° Bé. specific gravity and 6.9 kilos of sodium nitrite is run into a solution of 24.8 kilos of sodium 2-naphthol-6-sulfonate and 23 kilos of caustic soda-lye of 40° Bé. specific gravity, in a suitable proportion of water, say 1,000 kilos. There is then added a solution of 4 kilos of crystallized barium chlorid and the whole is boiled. When cold, a washed hydrated alumina-blanc-fixe paste obtained in the usual manner from 100 kilos of aluminum sulfate, 50 kilos of sodium carbonate and 70 kilos of barium chlorid is stirred in; the lake is then filtered, pressed and dried. A printing color is thus obtained of very great fastness to light.

Having now described our invention, what we claim is:—

As new products, the body-colors derived from the azo dyestuff resulting from diazotized ortho-nitranilin and naphtholsulfonic acid—2:6, being brilliant orange-red to scarlet colored powders insoluble in water and oil and exceedingly fast to light.

In testimony, that we claim the foregoing as our invention, we have signed our names in presence of two subscribing witnesses.

OTTO ERNST,
CARL PRETZELL.

Witnesses:
JEAN GRUND,
CARL GRUND.